(No Model.)
G. P. VICKEN.
EARTH AUGER.
No. 470,725. Patented Mar. 15, 1892.
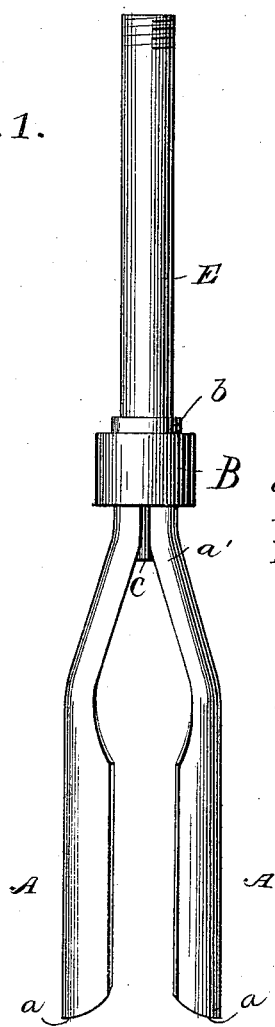
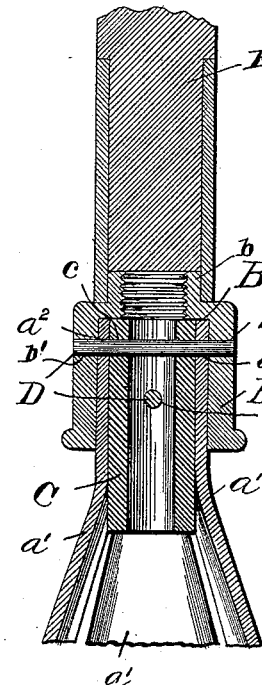
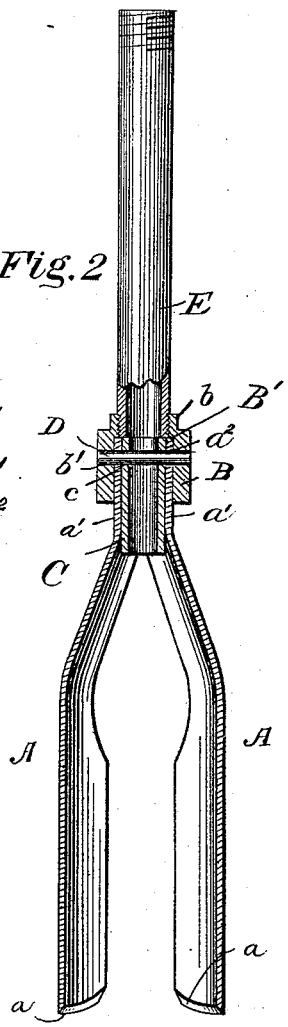
Witnesses
Julius Ulke, Jr.
D. P. Nothaupt
Inventor
George P. Vicken.
By his Attorneys,
C. A. Snow & Co.

UNITED STATES PATENT OFFICE.

GEORGE P. VICKEN, OF LOUISVILLE, KENTUCKY.

EARTH-AUGER.

SPECIFICATION forming part of Letters Patent No. 470,725, dated March 15, 1892.

Application filed December 2, 1891. Serial No. 413,810. (No model.)

*To all whom it may concern:*

Be it known that I, GEORGE P. VICKEN, a citizen of the United States, residing at Louisville, in the county of Jefferson and State of Kentucky, have invented a new and useful Earth-Auger, of which the following is a specification.

This invention relates to earth-augers; and it has for its object to provide an auger which shall be so constructed as to allow for an easy insertion of the boring-blades into the ground for the usual purpose of digging post-holes, and at the same time shall be so constructed as to allow said blades to readily expand or contract to receive or discharge any kind of soil without extra exertion on the part of the operator and without undue strain upon the various parts of the auger, which are securely fastened together, and also one which, on account of its simplicity and construction, will be more durable in service than those ordinarily employed.

With these and many other objects in view (which will readily appear as the nature of the invention is fully understood) the same consists in the novel construction, combination, and arrangement of parts hereinafter more fully described, illustrated, and claimed.

In the accompanying drawings, Figure 1 is a front elevation of an earth-auger or post-hole digger constructed in accordance with my invention. Fig. 2 is a longitudinal sectional view of the same. Fig. 3 is an enlarged detail longitudinal sectional view and illustrating the modified form of handle.

Referring to the accompanying drawings, A A represent a series of boring-blades arranged in any number desired according to the nature of the work for which the digger is designed, and having lower convexed cutting-edges $a$, which permit the blades to more easily enter the ground than with the ordinary straight-edged blades, and the same are constructed of any suitable metal and corrugated or pressed into any desired shape which adapts the same for digging when arranged in a tubular series of two or more blades. Each of the series of blades A are provided with the upper reduced shanks $a'$, provided with the perforations $a^2$, and adapted to fit snugly within the handle and blades receiving socket B. Said socket is constructed of suitable metal and is of a sufficient diameter to snugly receive the shanks of said blades, the extreme upper ends of which bear on and rest upon the stop-shoulder $B'$, located upon the inside and near the top of said receiving-socket. Thus when the auger or digger is driven into the earth the whole force and strain of the stroke comes upon said shoulder, which bears directly upon the top ends of said blades and gives greater force for their insertion into the earth. The socket B is further provided with an upwardly-extending and reduced interiorly-threaded neck $b$, projecting above the inner shoulder thereof and adapted to receive the lower-threaded ends of one of the handle-sections E, comprising a series of sections coupled together, as illustrated in the drawings, to form a handle of any desired length. The sections comprising said handle may either be hollow piping, solid rod-sections, or wooden sections, which latter are illustrated in Fig. 3 of the drawings, and shows the lowermost end of the wooden handle securely fastened within an extended neck, which would correspond to the threaded neck $b$ referred to, and the use of the different materials comprising said handle is changed according to the strength in which it is desired to construct the device and that which seems best adapted for the purpose. The shanks of the series of blades within said socket are securely and rigidly held therein by means of the wedge-plug C, driven up within the lower open end of said socket between said blades, and the same may either be a hollow-pipe plug or a solid plug, as desired, and to correspond somewhat to the other construction of the auger, whether the same is composed of hollow tubing, solid iron, or wooden sections. The said wedge-plug C is provided with a series of transverse perforations $c$, ranging in number according to the number of blades, and are designed to register with the perforations $a^2$ in the shanks of said blades and also with a corresponding series of perforations $b'$ in said socket, all of said registering perforations being designed to receive the securing-pins D, passing therethrough and thus holding the various parts—namely, the blade-shanks, wedge-plug, and socket—securely together, and thus providing an attachment of the blades to the handle-socket, which effectually prevents the same from accidental displacement, while the strain of the various parts is not upon said pins, but upon the handle and inner shoulder of said socket.

It may be readily noted that although the construction herein described is that preferably employed, nevertheless that various other modes of construction may be used to put the various parts of the auger together, while at the same time retaining the primary principles thereof and without departing from the spirit of the same.

Having thus described my invention, what I claim, and desire to secure by Letters Patent, is—

1. In an earth-auger, the combination of a socket having an upwardly-extending neck and transverse perforations, a series of auger-blades seated within said socket and provided with perforations registering with the perforations therein, a wedging-plug inserted within the lower end of said socket between the upper ends of said blades and provided with transverse perforations registering with the perforations in the socket and blade-shanks, coupling or securing pins transversely engaging all of said registering perforations, and a handle comprising a series of sections coupled together and with the neck of said socket, substantially as set forth.

2. In an earth-auger, the combination of a socket having an upwardly-extending threaded neck, an interior abutting shoulder within the same and below said neck, and transverse perforations in the body thereof, a series of auger-blades having the reduced shanks seated within said socket and against the shoulder therein and provided with perforations registering with the perforations in said socket, a wedging-plug inserted within the lower end of said socket between said blade-shanks and provided with transverse perforations registering with the socket and blade-shank perforations, coupling or securing pins transversely engaging all of said registering perforations, and a handle comprising a series of sections coupled together and with the threaded neck of said socket, substantially as set forth.

In testimony that I claim the foregoing as my own I have hereto affixed my signature in the presence of two witnesses.

GEORGE P. VICKEN.

Witnesses:
HERMAN KEENER,
WM. F. KRAFT, Jr.